US008571494B2

(12) United States Patent  
Budianu et al.

(10) Patent No.: US 8,571,494 B2  
(45) Date of Patent: Oct. 29, 2013

(54) METHOD AND APPARATUS FOR ESTABLISHING COMMUNICATIONS IN LOW SIGNAL TO NOISE RATIO ENVIRONMENTS

(75) Inventors: Petru Christian Budianu, San Diego, CA (US); Amal Ekbal, San Diego, CA (US); David Jonathan Julian, San Diego, CA (US); Jun Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 883 days.

(21) Appl. No.: 12/692,099

(22) Filed: Jan. 22, 2010

(65) Prior Publication Data

US 2011/0183607 A1    Jul. 28, 2011

(51) Int. Cl.  
*H04B 1/66* (2006.01)

(52) U.S. Cl.  
USPC ........... 455/102; 455/108; 455/110; 370/468; 375/267

(58) Field of Classification Search  
USPC ........ 455/102, 108, 110, 115.1, 452.2, 67.11, 455/62; 370/468, 473, 474, 513; 375/267, 375/261  
See application file for complete search history.

(56) References Cited

U.S. PATENT DOCUMENTS

| | | | | |
|---|---|---|---|---|
| 7,379,507 B2* | 5/2008 | Chen et al. | ...................... | 375/267 |
| 7,535,879 B2* | 5/2009 | Morioka et al. | .............. | 370/338 |
| 7,627,067 B2* | 12/2009 | Coulson | .......................... | 375/362 |
| 7,729,378 B2* | 6/2010 | Hoo et al. | ...................... | 370/471 |
| 7,813,765 B2* | 10/2010 | Kurose | ........................... | 455/561 |
| 7,940,212 B2* | 5/2011 | Ammann | .................. | 342/357.46 |
| 8,228,941 B2* | 7/2012 | Morioka et al. | .............. | 370/465 |
| 8,295,304 B1* | 10/2012 | Smidth | .......................... | 370/468 |
| 2002/0085619 A1* | 7/2002 | Cho et al. | ....................... | 375/130 |
| 2005/0153735 A1* | 7/2005 | Morioka et al. | ........... | 455/553.1 |
| 2005/0201361 A1* | 9/2005 | Morioka et al. | .............. | 370/352 |
| 2008/0227393 A1 | 9/2008 | Tang et al. | | |
| 2010/0046612 A1* | 2/2010 | Sun et al. | .................. | 375/240.02 |
| 2011/0193745 A1* | 8/2011 | Ammann | .................. | 342/357.77 |
| 2012/0243522 A1* | 9/2012 | Morioka et al. | .............. | 370/338 |
| 2013/0044626 A1* | 2/2013 | Smidth | .......................... | 370/252 |

FOREIGN PATENT DOCUMENTS

| | | |
|---|---|---|
| EP | 1793531 A1 | 6/2007 |
| WO | WO 0199369 A2 | 12/2001 |

OTHER PUBLICATIONS

International Search Report and Written Opinion—PCT/US2010/061893—ISA/EPO—Apr. 15, 2011.

* cited by examiner

*Primary Examiner* — Minh D Dao

(74) *Attorney, Agent, or Firm* — Paul S. Holdaway

(57) ABSTRACT

An apparatus is disclosed having a receiver configured to communicate, by a first apparatus, with a second apparatus in a first mode; determine side information by the first apparatus based on the communication during the first mode; and store the side information by the first apparatus for communication in a second mode with the second apparatus, wherein the first and second modes of communication have different date rates. A method for wireless communications is also disclosed.

19 Claims, 4 Drawing Sheets

METHOD AND APPARATUS FOR ESTABLISHING COMMUNICATIONS IN LOW SIGNAL TO NOISE RATIO ENVIRONMENTS

BACKGROUND

I. Field

The following description relates generally to communication systems, and more particularly to a method and apparatus for establishing communications in low signal to noise ratio environments.

II. Background

In certain wireless systems, before two devices can communicate, they must be paired. The pairing process typically includes an acquisition process. In most cases, the acquisition process for wireless communications under low signal-to-noise ratio (SNR) environments is a difficult problem as there are several hurdles. Two issues to consider include the presence of clock drift and the possible existence of interference.

During the communication process between two devices, there may exist clock drift from the difference between the two clocks of two different devices. The presence of clock drift reduces the effectiveness of the transmissions between devices as the timing for signals often need to be managed within a small tolerance, especially in high speed communications. Clock drift exists because of hardware manufacturing tolerances and, to some extent, environmental factors. However, compensation for clock drift by another device may be achieved more efficiently if the other device is able to have an estimate of the clock drift before the compensation process.

Preamble sequences for wireless communications are used as part of the acquisition process. One purpose for the use of the preamble is to allow time for the receiver in each node to achieve lock of the receiver's Digital Phase Lock Loop, which is used to synchronize the receive data clock to the transmit data clock. At the point when the first bit of the preamble is received, each receiver may be in an arbitrary state. During the course of detecting the preamble, it learns the correct phase, but in doing so it may need to acquire a number of samples. The number of samples that need to be captured and analyzed for proper acquisition is dependent on the received signal quality, which is affected, among others, by the amount of clock drift.

Consequently, it would be desirable to address one or more of the deficiencies described above.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to apparatus and methods that provide wireless communications, where a method for wireless communications includes communicating, by a first apparatus, with a second apparatus in a first mode; determining side information by the first apparatus based on the communication during the first mode; and storing the side information by the first apparatus for communication in a second mode with the second apparatus, wherein the first and second modes of communication have different date rates.

In another aspect, an apparatus for wireless communications is provided that includes a processing system configured to communicate, by a first apparatus, with a second apparatus in a first mode; determine side information by the first apparatus based on the communication during the first mode; and store the side information by the first apparatus for communication in a second mode with the second apparatus, wherein the first and second modes of communication have different date rates.

In yet another aspect, an apparatus for wireless communications is provided that includes means for communicating, by a first apparatus, with a second apparatus in a first mode; means for determining side information by the first apparatus based on the communication during the first mode; and means for storing the side information by the first apparatus for communication in a second mode with the second apparatus, wherein the first and second modes of communication have different date rates.

In yet another aspect, a computer-program product for wireless communications is provided that includes a machine-readable medium including instructions executable to communicate, by a first apparatus, with a second apparatus in a first mode; determine side information by the first apparatus based on the communication during the first mode; and store the side information by the first apparatus for communication in a second mode with the second apparatus, wherein the first and second modes of communication have different date rates.

In yet another aspect, a sensing device is provided that includes an antenna; a transceiver, coupled to the antenna, configured to communicate with another apparatus in a first mode using the antenna; a processor processing system coupled to the transceiver and configured to determine side information based on the communication during the first mode; and a memory coupled to the processor and configured to store the side information for communication in a second mode with the other apparatus, wherein the first and second modes of communication have different date rates.

In yet another aspect, a headset is provided that includes a transducer; a transceiver configured to communicate with another apparatus in a first mode; a processing system coupled to the transceiver and transducer, and configured to determine side information based on the communication during the first mode; and store the side information for communicating data for use with the transducer in a second mode with the other apparatus, wherein the first and second modes of communication have different date rates.

In yet another aspect, a watch is provided that includes a user interface; a transceiver configured to communicate with another apparatus in a first mode; a processing system coupled to the transceiver and the user interface, and configured to determine side information based on the communication during the first mode; and store the side information for communicating data for use with the user interface in a second mode with the other apparatus, wherein the first and second modes of communication have different date rates.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents

DETAILED DESCRIPTION

Figure 1:
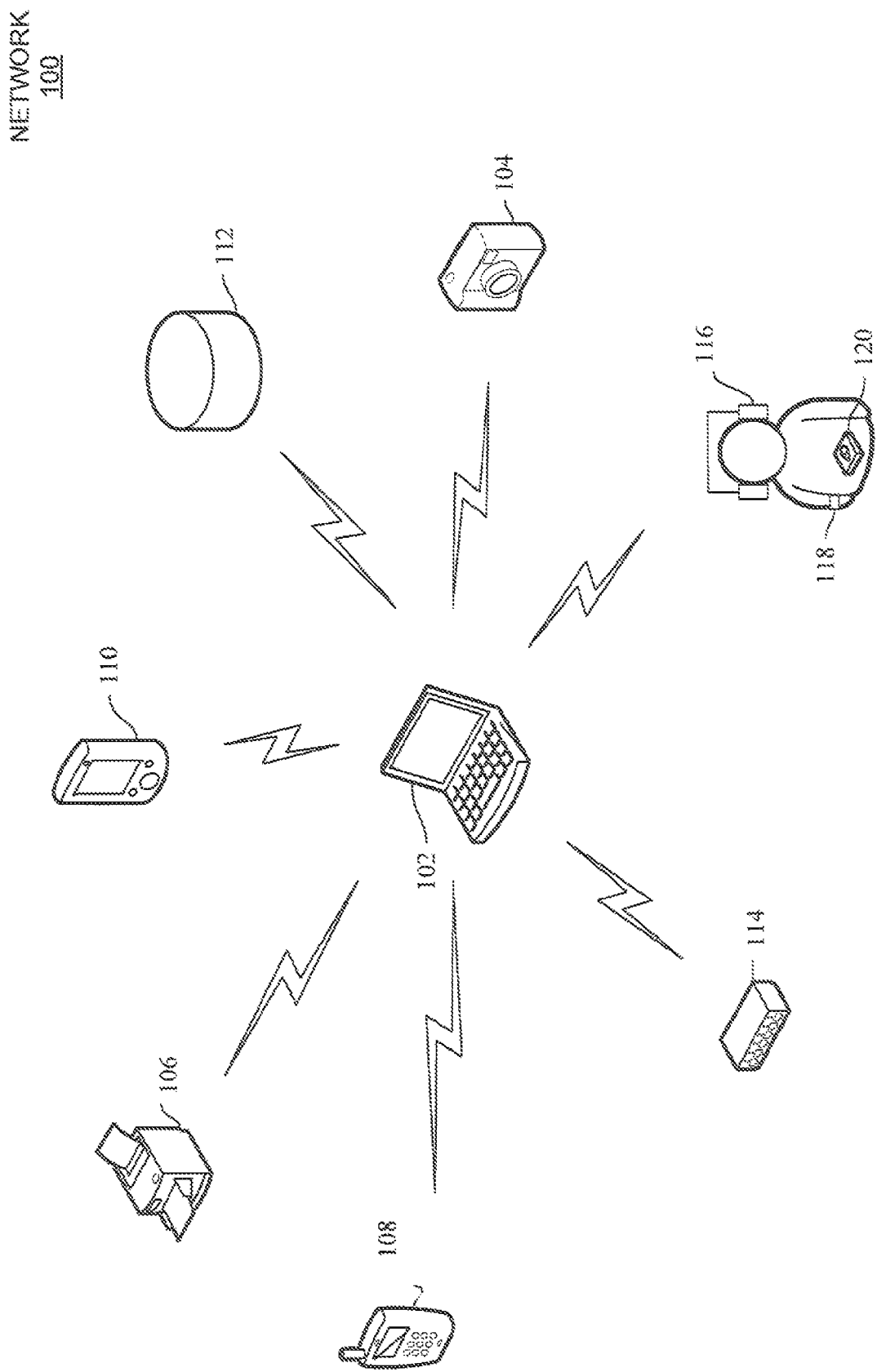
FIG. 1 is a diagram of a wireless communications network configured in accordance with an aspect of the disclosure.

Various aspects of the novel systems, apparatus and methods are described more fully hereinafter with reference to the accompanying drawings. The teachings disclosed herein may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect disclosed herein may be embodied by one or more elements of a claim.

Devices utilize a preamble sequence at the beginning of each packet. The preamble is used during the establishment of communications between two devices. In the most general form, the acquisition preamble consists of a sequence of $N_p$=64 pulses, each pulse being placed in one out of 16 positions to implement a 8× hopping sequence, where each pulse can represent a "0" or "1". The pulse sequence may be transmitted 10, 20 or 40-times to allow for other devices to acquire the preamble.

The incoming signal is sampled such that 16 binary samples are collected from one hop interval. Thus, for each repetition of a preamble, the receiver collects:

64×256=16 k samples.

The receiver begins the sample collection process at a random point during the preamble transmission and tries to identify the starting point of the preamble sequence. Thus, the receiver must test each of the 16 k hypotheses to determine how to receive the preamble.

In devices that have two modes of communication, such as low/high SNR modes, devices will need a higher number of pulses in low SNR than in high SNR environments (256 pulses versus 64 pulses). Consequently, devices operating in low SNR environments require a longer time interval to acquire, which is exacerbated by clock drift. Further, devices in a low SNR environment require higher power to communicate effectively because SNR is a function of link budget. Specifically, when the SNR is low, the devices also need to boost transmission power. Thus, the longer time to perform acquisition increases power consumption.

In one aspect of the disclosure, for devices that utilize two different types of channels, including a low data rate channel and a high data rate channel, information that is needed in the low data rate operation is acquired using high data rate operation. When two devices are close enough to each other such that their respective SNR measurements are high, the devices can pair and communicate on a common channel and save the clock drift and other information such that, when they are farther apart and their SNR measurements are low, they can use such clock drift and other information for acquisition. Pairing must occur at the high data rate versus the low data rate mode, during which side information is determined. Side information comprises clock drift and information regarding preamble sequence. By way of example and not limitation, a high SNR is defined to mean that EpN0, which is the ratio between energy per pulse and noise spectrum density, is much higher than 3 dB. Conversely, a low SNR is defined to mean that EpN0 is equal to or lower than 3 dB.

In an aspect of the disclosure, a first data rate for the first mode of communication is on the order of 1 Mbps and a second data rate for the second mode of communication is on the order of 10 kbps.

An example of a short range communications network suitable for supporting one or more aspects presented throughout this disclosure is illustrated in FIG. 1. The network 100 is shown with various wireless nodes that communicate using any suitable radio technology or wireless protocol. By way of example, the wireless nodes may be configured to support Ultra-Wideband (UWB) technology. Alternatively, the wireless nodes may be configured to support various wireless protocols such as Bluetooth or IEEE 802.11, just to name a few.

The network 100 is shown with a computer 102 in communication with the other wireless nodes. In this example, the computer 102 may receive digital photos from a digital camera 104, send documents to a printer 106 for printing, synch-up with e-mail on a personal digital assistant (PDA) 108, transfer music files to a digital audio player (e.g., MP3 player) 110, back up data and files to a mobile storage device 112, and communicate with a remote network (e.g., the Internet) via a wireless hub 114. The network 100 may also include a number of mobile and compact nodes, either wearable or implanted into the human body. By way of example, a person may be wearing a headset 116 (e.g., headphones, earpiece, etc.) that receives streamed audio from the computer 102, a watch 118 that is set by the computer 102, and/or a sensor 120 which monitors vital body parameters (e.g., a biometric sensor, a heart rate monitor, a pedometer, and EKG device, etc.).

Although shown as a network supporting short range communications, aspects presented throughout this disclosure may also be configured to support communications in a wide area network supporting any suitable wireless protocol, including by way of example, Evolution-Data Optimized (EV-DO), Ultra Mobile Broadband (UMB), Code Division Multiple Access (CDMA) 2000, Long Term Evolution (LTE), or Wideband CDMA (W-CDMA), just to name a few. Alternatively, the wireless node may be configured to support wired communications using cable modem, Digital Subscriber Line (DSL), fiber optics, Ethernet, HomeRF, or any other suitable wired access protocol.

In some aspects a wireless device may communicate via an impulse-based wireless communication link. For example, an impulse-based wireless communication link may utilize ultra-wideband pulses that have a relatively short length (e.g., on the order of a few nanoseconds or less) and a relatively wide bandwidth. In some aspects the ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a monitor that may receive data from the medical or environment sensing device, a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

Various aspects or features will be presented in terms of systems that may include a number of devices, components, modules, and the like. It is to be understood and appreciated that the various systems may include additional devices, components, modules, etc., and/or may not include all of the devices, components, modules etc. discussed in connection with the figures. A combination of these approaches may also be used. As those skilled in the art will readily appreciate, the aspects described herein may be extended to any other apparatus, system, method, process, device, or product.

Figure 2:
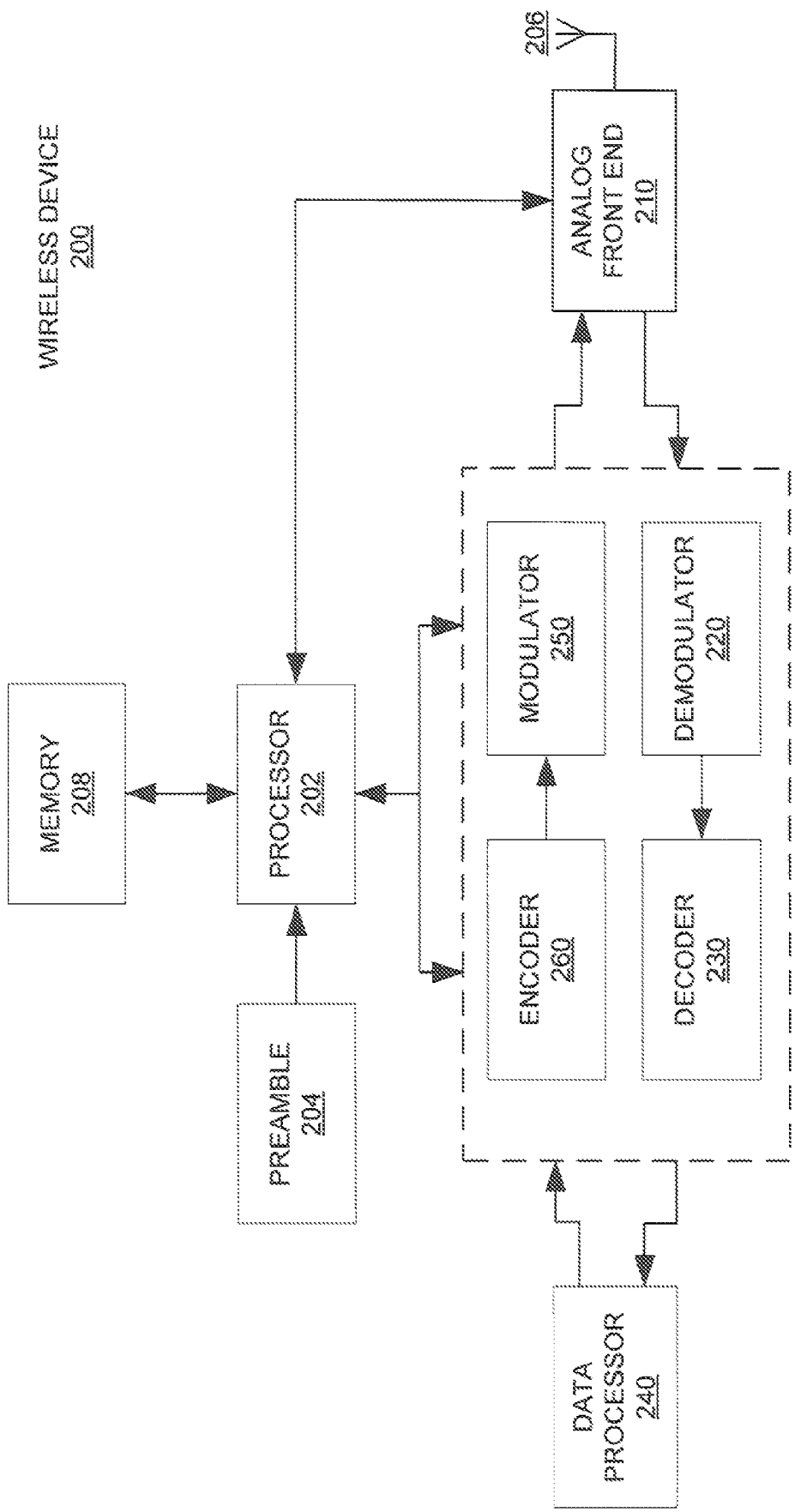
FIG. 2 is a wireless node that includes a front end processing system in a wireless node in the wireless communications network of FIG. 1.

FIG. 2 is a conceptual block diagram of a wireless device 200 illustrating an example of the signal processing functions of the PHY layer. In a receive mode, an analog front end 210 receives data from an antenna 206. The signal is often modulated (e.g., Turbo code) to facilitate Forward Error Correction (FEC) at the receiving node. The signal from the analog front end may be provided to a demodulator 220. The demodulator 220 combines the modulation symbols into a single stream. The stream is then sent to a decoder 230. Once decoded, the stream is sent to a data processor 240, which may be used to translate the modulation symbols back to the correct point in the signal constellation. In a transmit mode, an encoder 260 and a modulator 250 are used to implement the reverse operation of decoder 230 and demodulator 220, respectively. Specifically, the encoder 260 and the modulator 250 receive a stream from the data processor 240 to encode and create modulation symbols to send to the analog front end 210.

The wireless device includes a processor 202 that will use a stored preamble 204 for the operation of the demodulator 220 and the decoder 230 for the receive operation, and the encoder 260 and the modulator 250 for the transmit operation. For example, the stored preamble 204 may be transmitted during the acquisition process to another wireless device using the encoder 260 and the modulator 250. The processor 202 will also perform other processing tasks as described herein. A memory 208 is attached to the preamble processor 202 and may be used to store information necessary for the acquisition process and communication process in general. For example, during a pairing operation where the wireless device is on the preamble receipt side, the memory 208 may be used to store the received samples of the preamble to test hypotheticals.

Figure 3:
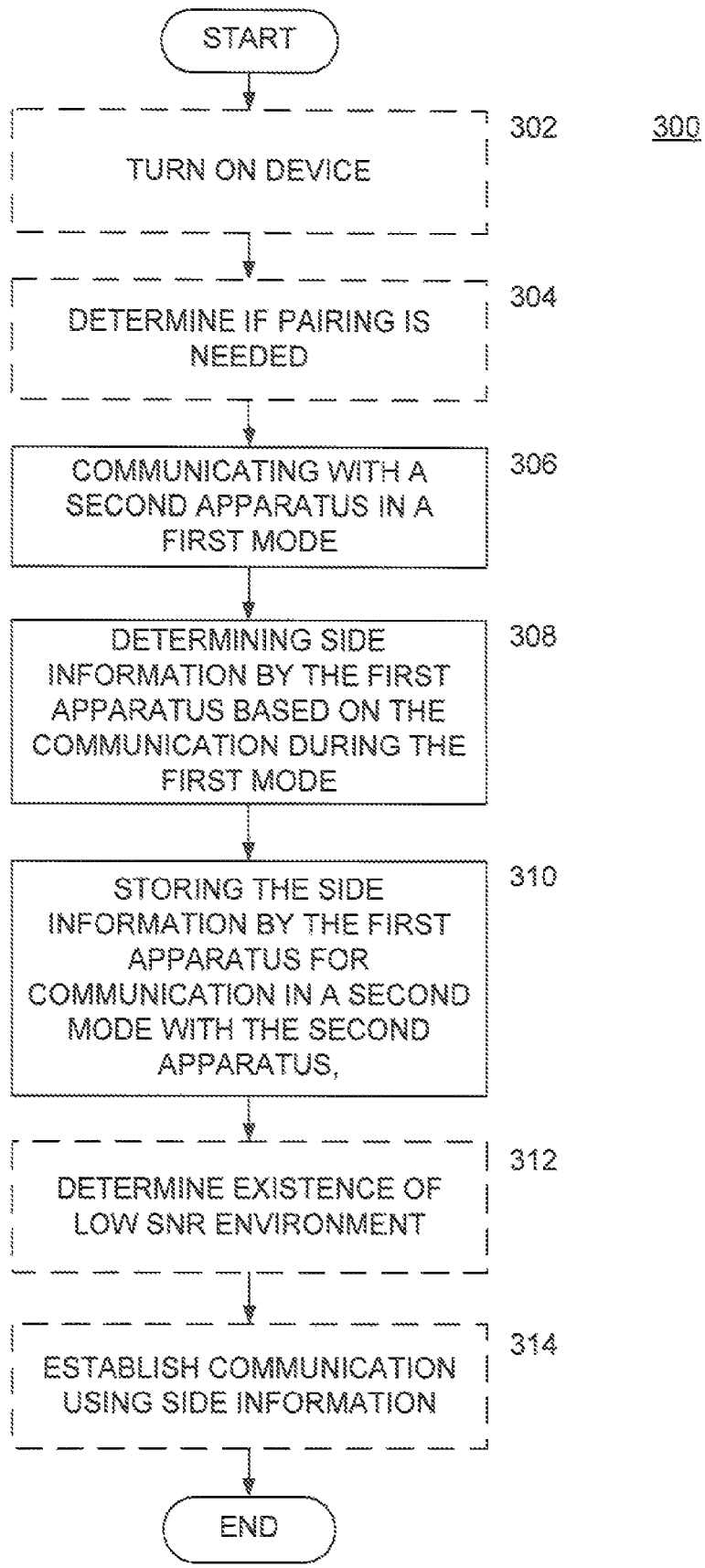
FIG. 3 is a flow diagram illustrating the operation of a communication acquisition scheme for low signal-to-noise ratio (SNR) environments configured in accordance with one aspect of the disclosure.

FIG. 3 illustrates a process 300 to address communication at low SNR for devices that can communicate in both high data rate and low data rate modes where, in step 302, two devices that are intended to communicate at low SNR are first placed close to each other and turned on.

In step 304, it is determined if pairing is requested. In the pairing process, certain information is exchanged and stored. In some practical scenarios, this might not be possible. Thus, in other aspects of the disclosure, besides establishing direct communication, a relay device may be used for this purpose.

In step 306, acquisition, which is needed to receive any packet needed for pairing, is performed in a high SNR environment using a high data rate mode. Steps 306 and the following steps 308 and 310 are necessary for the establishment of the high data rate communications.

In step 308, determining side information by the first apparatus based on the communication during the first mode.

In step 308, side information is stored by each device of the other device. In one aspect of the disclosure, side information includes clock drift, device capability/information such as capability of high/low data rate communication, and channel ID of the channel on which the devices will communicate.

In step 312, the devices are placed as desired. In such an environment, it is determined that the devices are in a low SNR environment. In one aspect of the disclosure, as described herein, the determination of SNR is a function of link budget, path loss and received power.

In step 314, a data exchange process will be performed after communication is established in the low SNR process. In the data exchange process, the devices will use the side information stored earlier in the process. Side information includes, but is not limited to, drift between the clocks of the two devices, and information regarding the preamble sequence used.

Figure 4:
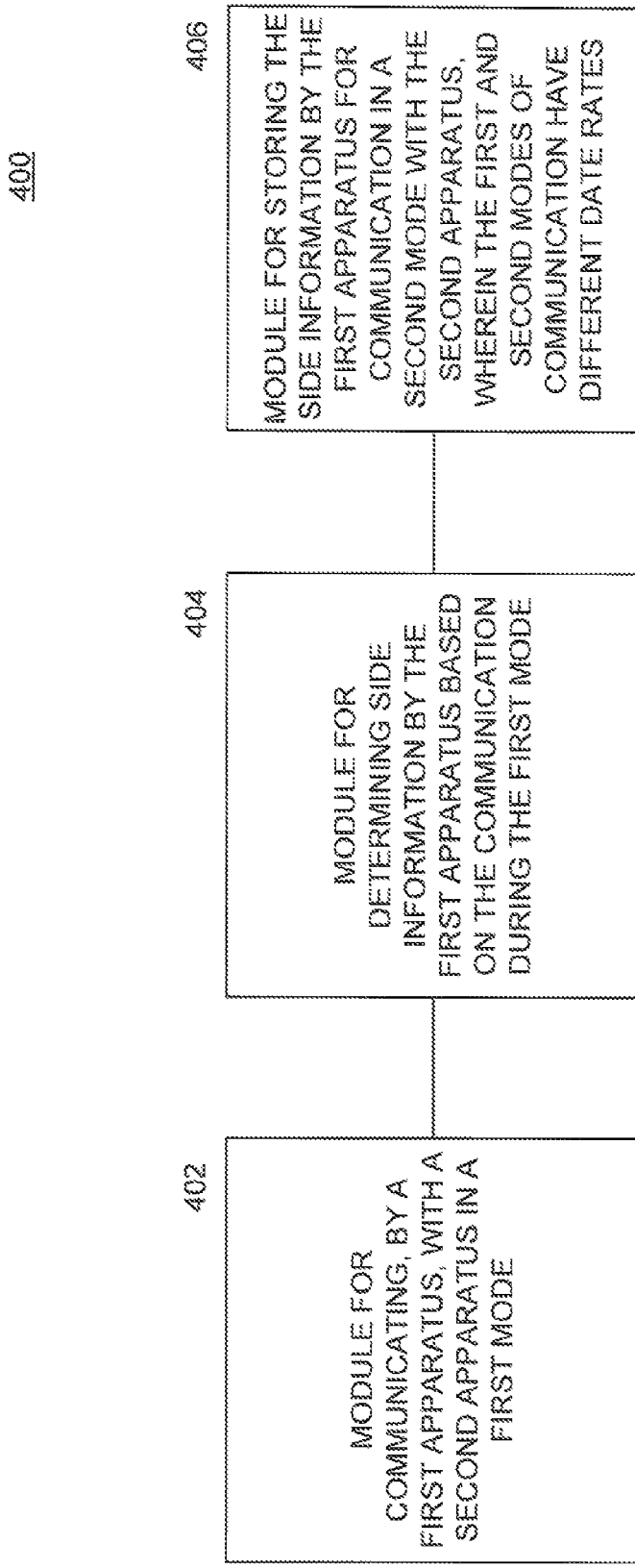
FIG. 4 is a block diagram illustrating the functionality of a STA apparatus for implementing a client-initiated UL scheme for a plurality of STAs in accordance with one aspect of the disclosure.

FIG. 4 is a diagram illustrating the functionality of an apparatus 400 in accordance with one aspect of the disclosure. The apparatus 400 includes a module 402 for communicating, by the apparatus, with a second apparatus in a first mode; a module 404 for determining side information by the apparatus based on the communication during the first mode; and a module 406 for storing the side information by the apparatus for communication in a second mode with the second apparatus, wherein the first and second modes of communication have different date rates. The module 402 includes means for communicating, by a first apparatus, with a second apparatus in a first mode. Referring back to FIG. 2, the means may include the analog front end 210 and the other communication blocks contained therein. The module 404 for determining side information by the first apparatus based on the communication during the first mode includes means like the processor 202. The module 406 may includes means like the memory 208 for storing the side information by the first apparatus for communication in a second mode with the second apparatus, wherein the first and second modes of communication have different data rates.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Those skilled would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the aspects disclosed herein.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the aspects disclosed herein. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects disclosed herein. In some aspects a computer program product may comprise packaging materials.

The previous description is provided to enable any person skilled in the art to understand fully the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Further, the phrase "at least one of a, b and c" as used in the claims should be interpreted as a claim directed towards a, b or c, or any combination thereof. Unless specifically stated otherwise, the terms "some" or "at least one" refer to one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of wireless communications comprising:
communicating, by a first apparatus, with a second apparatus in a first mode, wherein the first mode comprises a pairing of the first and second apparatuses in a channel environment associated with a first SNR;
determining device information by the first apparatus based on the communication during the first mode; and
storing the device information by the first apparatus for communication in a second mode with the second apparatus, wherein the second mode comprises a data exchange between the first and second apparatuses in a channel environment associated with a second SNR, wherein the first SNR is greater than the second SNR, and wherein the first and second modes of communication have different data rates.

2. The method of claim 1, wherein the device information comprises identification information related to the second apparatus.

3. The method of claim 1, wherein the device information comprises frequency offset information between the first and second apparatuses.

4. The method of claim 1, wherein the device information comprises phase offset information between the first and second apparatuses.

5. The method of claim 1, wherein a first data rate associated with the first mode of communication is higher than a second data rate associated with the second mode of communication.

6. An apparatus for wireless communications, comprising:
a processing system configured to:
communicate with a second apparatus in a first mode, wherein the first mode comprises a pairing of the apparatus and the second apparatus in a channel environment associated with a first SNR;
determine device information based on the communication during the first mode; and
store the device information for communication in a second mode with the second apparatus, wherein the second mode comprises a data exchange between the apparatus and the second apparatus in a channel environment associated with a second SNR, wherein the first SNR is greater than the second SNR, and wherein the first and second modes of communication have different data rates.

7. The apparatus of claim 6, wherein the device information comprises identification information related to the second apparatus.

8. The apparatus of claim 6, wherein the device information comprises frequency offset information between the apparatus and the second apparatus.

9. The apparatus of claim 6, wherein the device information comprises phase offset information between the apparatus and the second apparatus.

10. The apparatus of claim 6, wherein a first data rate associated with the first mode of communication is higher than a second data rate associated with the second mode of communication.

11. An apparatus for wireless communications, comprising:
means for communicating with a second apparatus in a first mode, wherein the first mode comprises a pairing of the apparatus and the second apparatus in a channel environment associated with a first SNR;
means for determining device information based on the communication during the first mode; and
means for storing the device information for communication in a second mode with the second apparatus, wherein the second mode comprises a data exchange between the apparatus and the second apparatus in a channel environment associated with a second SNR, wherein the first SNR is greater than the second SNR, and wherein the first and second modes of communication have different data rates.

12. The apparatus of claim 11, wherein the device information comprises identification information related to the second apparatus.

13. The apparatus of claim 11, wherein the device information comprises frequency offset information between the apparatus and the second apparatus.

14. The apparatus of claim 11, wherein the device information comprises phase offset information between the apparatus and the second apparatus.

15. The apparatus of claim 11, wherein a first data rate associated with the first mode of communication is higher than a second data rate associated with the second mode of communication.

16. A computer-program product for wireless communications, comprising:
a machine-readable storage device comprising instructions executable to:
communicate, by a first apparatus, with a second apparatus in a first mode, wherein the first mode comprises a pairing of the first and second apparatuses in a channel environment associated with a first SNR;
determine device information by the first apparatus based on the communication during the first mode; and
store the device information by the first apparatus for communication in a second mode with the second apparatus, wherein the second mode comprises a data exchange between the first and second apparatuses in a channel environment associated with a second SNR, wherein the first SNR is greater than the second SNR, and wherein the first and second modes of communication have different date rates.

17. A communication system comprising:
an antenna;
a transceiver, coupled to the antenna, configured to communicate with another apparatus in a first mode using the antenna, wherein the first mode comprises a pairing of the communication system and the another apparatus in a channel environment associated with a first SNR;
a processing system coupled to the transceiver and configured to:
determine device information based on the communication during the first mode; and
store the device information for communication in a second mode with the other apparatus, wherein the second mode comprises a data exchange between the communication system and the another apparatus in a channel environment associated with a second SNR, wherein the first SNR is greater than the second SNR, and wherein the first and second modes of communication have different date rates.

18. A headset comprising:
a transducer;
a transceiver configured to communicate with another apparatus in a first mode;
a processing system coupled to the transceiver and transducer, and configured to:

determine device information based on the communication during the first mode, wherein the first mode comprises a pairing of the headset and the another apparatus in a channel environment associated with a first SNR; and store the device information for communicating data for use with the transducer in a second mode with the other apparatus, wherein the second mode comprises a data exchange between the headset and the another apparatus in a channel environment associated with a second SNR, wherein the first SNR is greater than the second SNR, and wherein the first and second modes of communication have different date rates.

19. A watch comprising:

a user interface;

a transceiver configured to communicate with another apparatus in a first mode, wherein the first mode comprises a pairing of the watch and the another apparatus in a channel environment associated with a first SNR;

a processing system coupled to the transceiver and the user interface, and configured to:

determine device information based on the communication during the first mode; and store the device information for communicating data for use with the user interface in a second mode with the other apparatus, wherein the second mode comprises a data exchange between the watch and the another apparatus in a channel environment associated with a second SNR, wherein the first SNR is greater than the second SNR, and wherein the first and second modes of communication have different date rates.

* * * * *